United States Patent
Robinson et al.

[11] Patent Number: 5,509,444
[45] Date of Patent: Apr. 23, 1996

[54] FLOW THROUGH PRESSURE REGULATOR

[75] Inventors: Barry S. Robinson, Williamsburg; Jan L. Bennett, Newport News; Christopher T. Vannoy, Williamsburg, all of Va.

[73] Assignee: Siemens Automotive Corporation, Auburn Hills, Mich.

[21] Appl. No.: 413,648

[22] Filed: Mar. 30, 1995

[51] Int. Cl.$^6$ ............................................. G05D 16/08
[52] U.S. Cl. ........................... 137/508; 123/514; 137/859
[58] Field of Search ................................. 137/508, 859; 123/514

[56] References Cited

U.S. PATENT DOCUMENTS

| | | |
|---|---|---|
| 4,627,463 | 12/1986 | Johnstone .................................. 137/510 |
| 4,741,360 | 5/1988 | Affeldt ...................................... 137/510 |
| 5,435,344 | 7/1995 | Robinson .................................. 137/508 |
| 5,435,345 | 7/1995 | Robinson .................................. 137/508 |

Primary Examiner—Robert G. Nilson
Attorney, Agent, or Firm—Russel C. Wells

[57] ABSTRACT

A flow through pressure regulator as may be used in a fuel delivery system for a motor vehicle has a contained, but floating ball valve. The ball valve open and closes a central passageway through the diaphragm of the regulator. The diaphragm divides the interior of the regulator into 2 chambers, both of which has fuel. A retainer means supports the ball and allows both axial and radial movement and coupled with a small bias spring seating in a bore, the ball functions to automatically seat itself. The small bias spring does not interfere with the ball valve seating itself.

8 Claims, 2 Drawing Sheets

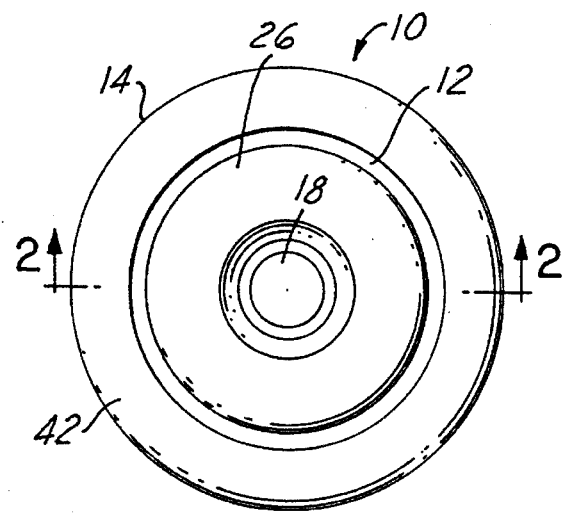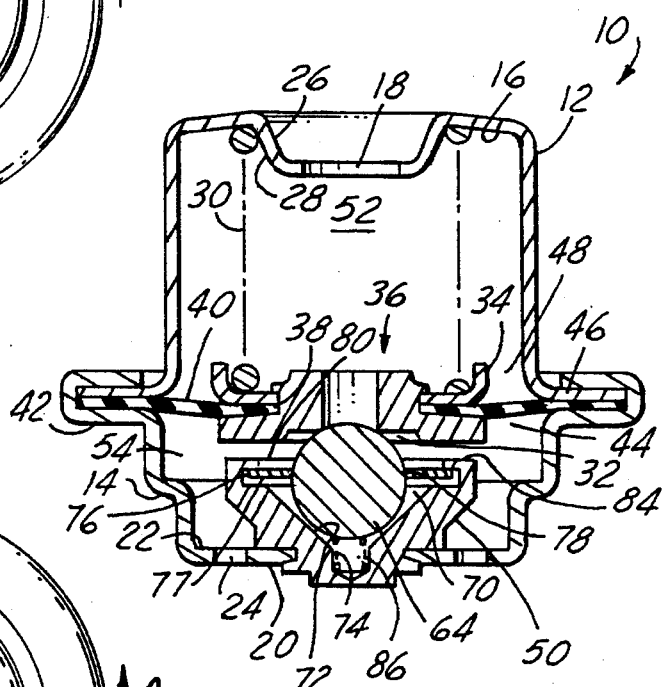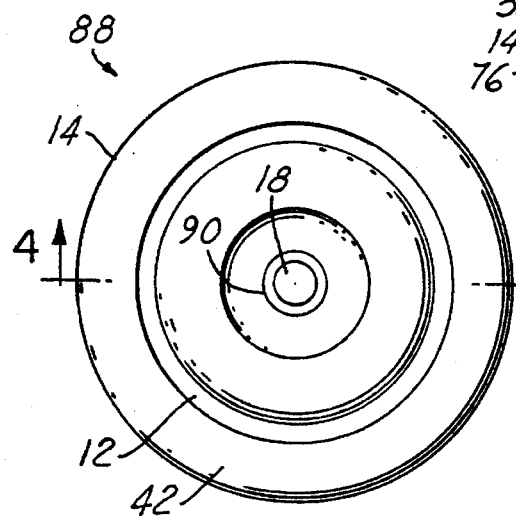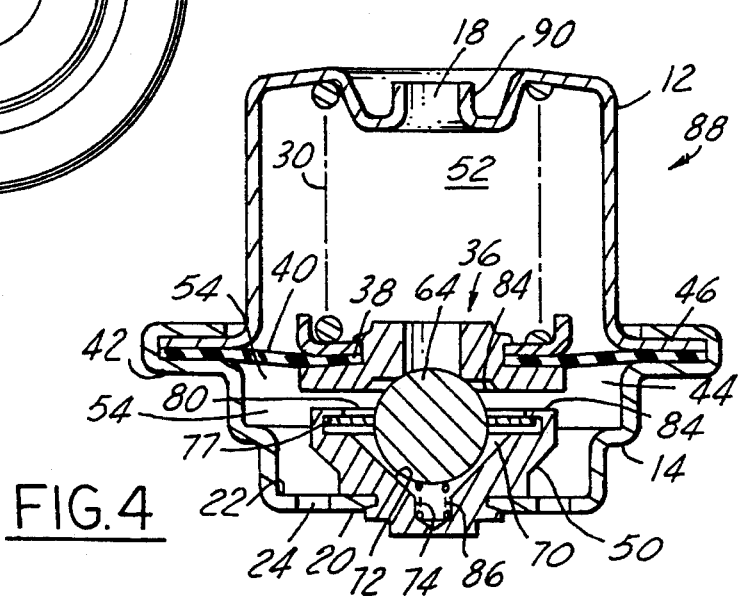
FIG. 1
FIG. 2
FIG. 3
FIG. 4

FLOW THROUGH PRESSURE REGULATOR

BACKGROUND OF INVENTION

1. Field of Invention

This invention elates to fuel pressure regulators in general and more particularly to a floating ball regulator wherein the ball which closes the valve can orientate itself to provide accurate sealing.

2. Summary of the Invention

U.S. Pat. No. 4,627,463, entitled "Fuel Pressure Regulator", issued on Dec. 9, 1986 discloses a fuel pressure regulator comprising a housing, a diaphragm dividing the housing into a first chamber and a second chamber, a passage from the exterior of the housing to the first chamber, an inlet and an outlet associated with the second chamber of the housing, and a valve seat associated with the outlet. A cage is mounted on and movable with the diaphragm and a spring within the first chamber yieldingly urges the cage toward the valve seat. The cage supports a pair of plates which retain a valve ball. The first plate has an opening though which a portion of the ball projects and a second plate retains the first plate and the ball within the cage. The first plate is movable laterally to provide for proper centering of the ball in the valve seat. A light spring extends between the cage and the ball to urge the ball against the first plate. The fuel flows into the first chamber, through the ball valve portion and out through a passage from the first chamber. It is not a flow through pressure regulator.

U.S. Pat. No. 4,741,360, entitled "Fuel Pressure Regulator" is more compact, easier to assemble and less costly fuel pressure regulator than that of U.S. Pat. No. 4,627,463. This regulator does not utilize a ball to function as a valve member and is not a flow through pressure regulator.

Prior Art U.S. Pat. No. 4,928,729 entitled "Fuel Pressure Regulator Valve", issued on May 29, 1990, 4,991,556 entitled "Automotive Fuel Rail Assemblies with Integral Means for Mounting Fuel Regulator", issued on Feb. 12, 1991, 5,002,030 entitled "Fuel Rail Assemblies for Internal Combustion Engines", issued on Mar. 26, 1991, and 5,076,320 entitled "Fuel Rail Mounted Fuel Pressure Regulator" and issued on Dec. 31, 1991, all teach the mounting of a fuel pressure regulator on a fuel rail assembly for the purpose of regulating the pressure of the fuel that is supplied to the injectors. The pressurized fuel that is delivered to the fuel rail is pumped from a fuel tank through a fuel supply conduit and the excess fuel is returned from the fuel pressure regulator's return port through a fuel return conduit to the fuel tank. These types of systems are classified as a return type system. The fuel pressure regulator is referenced to engine intake manifold vacuum so that the regulated pressure across the fuel injectors is essentially insensitive to changes in the manifold vacuum. None of the aforementioned fuel pressure regulators are flow through regulators in as much as one of the typically 2 chambers is a pressure referenced chamber which is usually connected to manifold vacuum and remains dry.

U.S. patent application Ser. No. 08/269,406 entitled "Flow Through Fuel Pressure Regulator" and 08/239,665 entitled "Flow Through Fuel Regulator", are both assigned to the common assignee as is this application. Both of these applications are directed to a pressure regulator that is typically mounted in the fuel tank and are used in what is basically classified as a returnless fuel system. In each of these, the fuel that flows through the pressure regulator is supplied to a fuel filter and from there to the fuel rail for distribution to the fuel injectors. The present fuel pressure regulator is much simpler in construction and is therefore much less expensive to manufacture.

Fuel pressure regulator as described in U.S. Pat. No. 4,627,463 has the fuel inlet and fuel outlet in the same housing chamber. In order to maintain the valve actuator, this regulator requires two washers, one of which is crimped into place and the other is retained by the first washer and has both axial and radial movement. In this patent there is no means to adjust the radial movement of the valve actuator which is a ball member. The axial movement is totally a function of the part tolerances. In conventional regulators, the adjustment for axial movement is by varying the crimping force on the member which locates and holds the valve actuator. In this manner, the tolerance stack-ups of the various parts of the regulator are taken into account. This additional washer results in additional tolerances resulting in additional axial movement; increases cost and complicates manufacture. In order to seat the valve actuator, which is a ball, this device requires a cage with a central post providing a point contact with the ball. The location of the post, well inside the cage, provides difficulty in machining the post surface. A small biasing spring must be assembled around the post and in the cage. The outside diameter of the post supports and retains the spring through the spring inside diameter and in assembling the regulator, care must be taken to assure that the spring is properly installed and not sitting off center or cocked in the cage pocket.

In order to solve the problems of the prior art flow through regulators, the present flow through regulator uses a pocket to house a ball, spring and a ball retainer means allowing axial and radial ball movement. The first bias means which is a small basing spring just falls into the pocket and therefore can not be off center or cocked when it biases the ball away from the bottom of the pocket.

In addition, the pocket for holding and locating the ball is not as expensive to manufacture and assemble as the prior art cages. This is because the tolerances for the manufacture are not as tight as in the prior art cages.

The ball valve actuator is much simpler to design and use than any flat surface valve actuator whether it be a flat on spherical member, or a flat plate.

BRIEF DESCRIPTION OF THE DRAWINGS

In the drawings:

FIG. 1 is a plan view of a flow through pressure regulator;

FIG. 2 is a cross sectional view of the flow through pressure regulator taken along line 2—2 of FIG. 1;

FIG. 3 is a plan view of another embodiment of the flow through pressure regulator;

FIG. 4 is a cross sectional taken along line 4—4 of FIG. 3;

DETAILED DESCRIPTION

Figure 5:
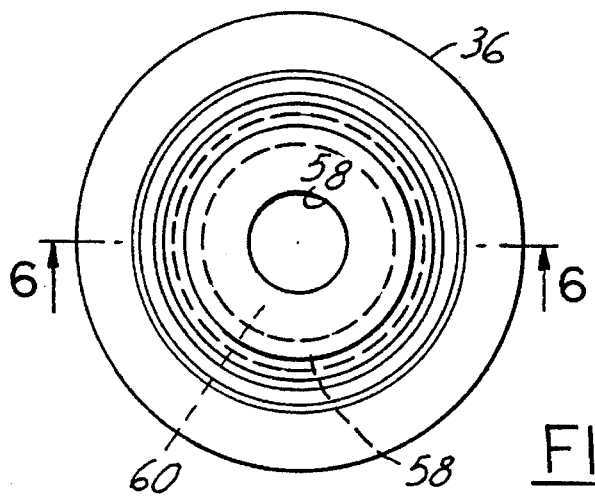
FIG. 5 is a plan view of the valve seat member.

Referring to FIG. 1, there is illustrated a flow through pressure regulator 10 having a first cup shaped cover means 12 and a second cup shaped cover means 14 which are crimped together to form an unitary hollow member. In the axially aligned center of the enclosed end 16 of the first cover 12 is an outlet port 18 wherein fuel flows out of the regulator 10. Around the bottom 20 of the enclosed end 22 of the second cover 14 is located at least one fuel inlet aperture 24 for receiving fuel into the regulator 10.

Referring to FIG. 2, a cross-sectional view of the regulator 10, the first cover 12 has a dimpled center portion 26 in the enclosed end 16 forming the fuel outlet port 18 and a spring locator means 28. A bias means such as a spring 30 functions to bias the valve seat member 36 of the regulator 10 at a predetermined amount of pressure which relates to the pressure desired by the regulator. The other end of the spring 30 is located in a spring retainer 34 that is secured to a valve seat member 36 mounted in a central aperture 38 in a diaphragm 40. The diaphragm 40 is supported around its circumference on a circumferential flange 42 radially extending from the open end 44 of the second cover 14 and is crimped between a circumferential flange 46 extending radially outward of the open end 48 of the first cover 12. The flange 42 of the second cover 14 is rolled over the circumferential edge of the first cover 12 and crimped to form the unitary member. At the enclosed end 22 of the second cover 14 is a valve actuator housing means 50 which is secured to the second cover 14.

Both the first 12 and second 14 covers are essentially cup shaped tubular members which are closed at one end and opened at the other end forming a first chamber 52 in the first cover 12 and a second chamber 54 in the second cover 14.

Figure 6:
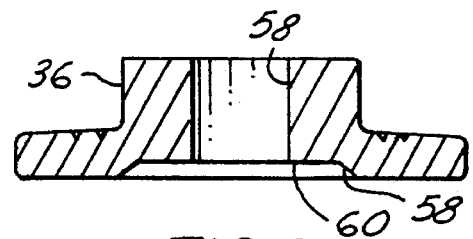
FIG. 6 is a cross section view taken along line 6—6 of FIG. 5.

Referring to FIGS. 5 and 6, there is illustrated the valve seat member 36 as found in both the embodiment s illustrated in FIGS. 1 and 3. Mounted in the central aperture 38 of the diaphragm 40 is a valve seat member 36 which is secured to the diaphragm by means of a flange 56 on the valve seat member 36 and the spring retainer 34. The diaphragm 40 forms the boundary between the first 52 and second 54 chambers. The valve seat member 36 has a central flow through passageway 58 which is open into the first 52 or outlet chamber formed in the first cover 12. The other end 62 of the passageway is a sealing surface 60 on which the valve actuator 64, a ball, seats. This surface 60 begins at the bottom of a pocket 66 which has its side walls 68 converging toward the axis of the valve seat member 36. This end 62 of the valve seat member 36 opens into the second 54 or inlet chamber. In the manufacturing of the valve seat member 36, the sealing surface 60 is coined to assure a smooth sealing surface for the ball 64.

The ball valve actuator 64 is located in a conical chamber 70 in the valve actuator housing means 50. At the bottom 72 of the conical chamber 70 is an enclosed tubular bore 74 opening. This conical chamber 70 is sized so as to not interfere with the movement of the ball valve actuator 64. The ball 64 is retained in a ball retainer means 76 which is washer shaped member 77 and has a central aperture 78 that is somewhat smaller than the diameter of the ball 64. The central aperture 78 is coined to prevent a rough surface contacting the ball 64. At the wide end 80 of the conical chamber 70 there is formed a pocket 82. The washer shaped member 77 has an outside diameter which is smaller than the diameter of the pocket 82 of the valve actuator housing 50 and is retained in the axial direction, as viewed in FIG. 2, by crimping of the upper edge 84 of the valve actuator housing 50 over the washer shaped member 77. The retainer means 76 is not held tightly in the pocket 82 at the end of the conical chamber 70, but is free to move both axially and radially in the pocket 82. In the enclosed tubular bore 74, a light bias spring 86 is position to move the ball 64 in an axial direction away from the bottom 72 of the conical chamber 70. As viewed in FIG. 2, when this spring 86 biases the ball 64, the ball retainer means 76, which is located above the major diameter of the ball or its horizontal axis, is located in the pocket 82 against the inside of the upper edge 84 of the valve actuator housing 50.

Figure 7:
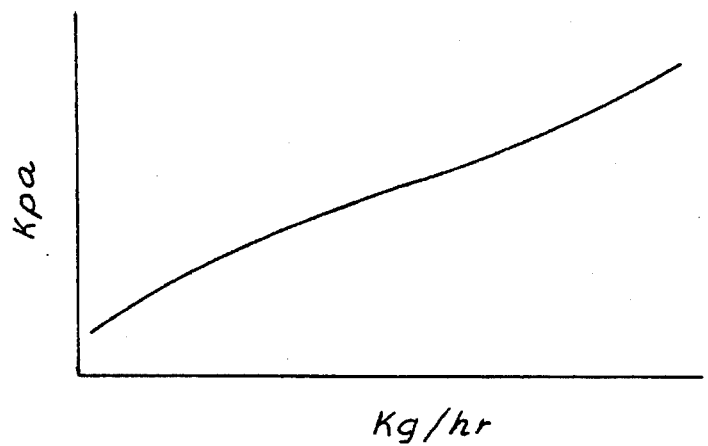
FIG. 7 is a graph of the pressure vs. flow of the regulator of FIG. 1.

The spring 86 functions to bias the ball 64 against the sealing surface 60 in the valve seat member 36. When the pressure of the inlet fuel is greater than the force exerted by the large bias spring 30, the diaphragm 40 moves in an axial direction and the ball 64 leaves the valve seat member 36. Fuel can then flow through the regulator 10 until the pressure of the large bias spring 30 is strong enough to return the valve seat member 36 to the ball 64 surface, thus closing the passageway 58 in the valve seat member 36. This is illustrated by the graph of FIG. 7 wherein the slope of the fuel pressure regulator 10 is positive and extends from a low pressure low fuel flow as found at a wide open throttle engine operation in a motor vehicle, to a high pressure, high flow rate as found at idle throttle engine operation.

The material of the several part of the fuel regulator is preferably stainless steel or some similar material which resists corrosion due to the nature of the fuel.

Referring to FIGS. 3 and 4, there is illustrated a second embodiment 88 of the flow through fuel pressure regulator. In this embodiment all of the various elements of the embodiment of FIG. 1 and 2 are identical with the exception that from the outlet port 18 in the first cover means 12, the cover is turned upward, as shown in FIG. 4, forming a tubular exit port 90. The length or height of the tubular exit port 90 functions to alter the back pressure in the regulator 88 which affects the amount of flow through the pressure regulator 88 of this embodiment from that of the embodiment 10 of FIGS. 1 and 2.

Figure 8:
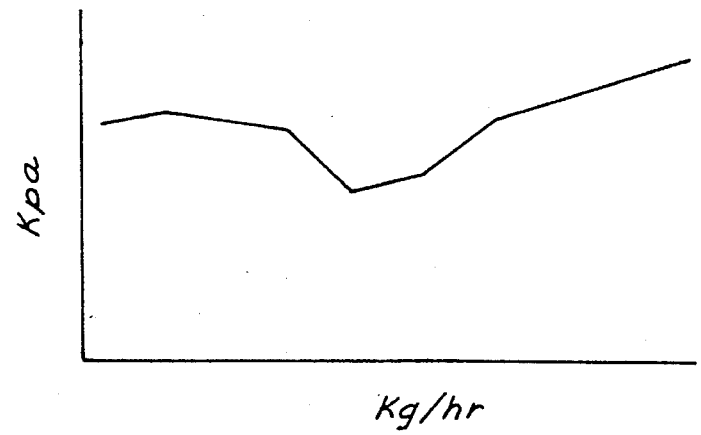
FIG. 8 is a graph of the pressure vs. flow of the regulator of FIG. 3.

This is illustrated in FIG. 8 which is graph of pressure on the y-axis or ordinate vs. flow rates on the x-axis or abscissa. Ideally the slope of the line on the graph should be zero which would produce a horizontal line parallel to the x-axis. Living in the real world, the flow through the regulator 10 or 88 at wide open throttle is very low because all of the fuel from the fuel pump, not shown, is being ejected from the fuel injectors, not shown, into the engine, also not shown. As illustrated in FIG. 7, at wide open throttle, the fuel pressure is lower than at idle. This is not good engine management. Conversely at idle engine conditions, the engine does not need as much fuel and the pressure regulator 10 or 88 is almost constantly open and large amounts of fuel flow through the regulator. This produces a slope which is a positive slope on the order of 0.05–0.1 which is an inclined line from the origin of the graph which represent wide-open throttle conditions where the pressure is low and the flow rate through the regulator is low to idle throttle conditions where the pressure is high and the flow rate through the regulator is high. A pressure regulator is designed to always operate and return fuel to the fuel tank.

For better engine operation, it is desired to have a high pressure at low flow rates. The tubular exit port 90 functions to quickly raise the fuel pressure at very low flow rates and once the flow rate begins to increase, the effect of the tubular exit port 90 decreases and the plot returns to the more conventional slope. This is illustrated in FIG. 8. In addition, the tubular exit port 90 has a beneficial effect in attenuating the noise level of fuel flow The features of the fuel pressure regulator 10 or 88 are the simplicity of the few number of elements which comprise the fuel regulator. With the ball valve actuator 64, contained in the retainer means 76 which is secured around the ball at a location on one side of the diameter of the ball 64, the ball can float in the axial direction and due to the easily installed small biasing spring 86 it is maintained against the upper flanged edge 84 of the valve actuator housing member 50. The retaining means 76, essentially a washer member 77, has a central aperture 78 coined to a dimension that is smaller than the diameter of the ball 64 and the outside diameter of the washer 77 is less than the diameter of the pocket 82 formed in the in the valve actuator housing 50. When the several parts, the first 12 and second 14 covers, the diaphragm 40 including the spring retainer 34 and the valve seat member 36 and valve actuator housing means 50 are assembled and crimped forming a unitary member so as to seal the chambers 52,54, the ball valve member 64 seeks and finds its seating on the valve seat member 36.

One method of assembling fuel regulator 10, 88 is by first securing the valve actuator housing means 50 to the second cover 12. The small bias spring 86 is placed in the bore 74. The ball retainer means 76 with the ball member 64 located therein is then located in the upper pocket 82 formed in the valve actuator housing 50 and the edges 84 of the housing are crimped over to retain the retainer means 76 in the pocket 82 formed therein. The valve seat member 36 is located and secured in the central aperture 38 of the diaphragm 40 between a flange 56 of the valve seat member 36 and a spring retainer 34. This completed diaphragm is located on the upper flange 42 surface of the second cover 14. The bias spring 30 is positioned in the spring retainer 34 and the first cover 12 is then placed over the bias spring 30 and located on the diaphragm 40. The flange 42 of the second cover 14 is crimped down to secure the first cover 12, second cover 14 and the diaphragm 40 forming an unitary member. The pressure at which the fuel is maintained is determined by the spring force of the bias spring 30 acting through its spring length.

What is claimed is:

1. A flow through fuel pressure regulator comprising:

a valve actuator housing having a conical shaped chamber formed therein extending from an enclosed bore to formable edges at the extreme of said chamber for forming a cylindrical shaped pocket opposite the bore;

first bias means located in the enclosed bore and extending into said pocket:

ball retainer means having a washer shaped member with a central aperture containing a ball valve member, said ball valve member restricted by the circumferential edges of said central aperture from moving in one direction and said washer member with said ball valve member located therein being secured in said pocket formed in said valve actuator housing, the outer diameter of said washer shaped member being smaller than the inner diameter of said pocket and the depth of said pocket being greater than the thickness of said washer shaped member;

a first cup shaped cover means enclosed at one end forming an inner chamber and having at least one inlet opening in the enclosed end; said valve actuator housing secured to the enclosed end of said first cover means and clear of said at least one inlet opening thereby allowing fuel to flow into said inner chamber, said first cover means having a circumferential flange extending radially outward of the open end of said cover means;

a valve seat member having an axially extending passageway extending from a valve seat to an axially opposite surface;

a diaphragm having a central aperture for locating and securing said valve seat member;

second bias means bearing against said valve seat member, said second bias means operative to locate said valve seat on said ball valve member; and a second cup shaped cover means enclosed at one end and having a central aperture in said closed end and extending in an axial direction away from said enclosed end forming a second chamber, said second cover means having a circumferential flange radially extending from the open end of said second cover means, said flange for positioning and securing said diaphragm against said flange of said first cover means to provide an unitary member.

2. A flow through regulator according to claim 1 wherein the flow through pressure regulator has a positive operating slope from low pressure, low fuel rate to high pressure at high flow rates.

3. A flow through regulator according to claim 1 additionally including a tubular exit shaped muffler means secured to said central aperture of said second cup shaped cover means for attenuating the noise level of fuel flow through the regulator.

4. A flow through regulator according to claim 3 wherein said tubular exit shaped muffler means causes a high fuel pressure characteristic for low flow rates and as the flow rates increase, the fuel pressure regulator decays to intersect the positive slope operation.

5. A flow through regulator according to claim 1 wherein said valve seat member has a coined conical shaped valve seat surrounding one end of said passageway.

6. A flow through regulator according to claim 1 wherein fuel flows from said at least one inlet opening in said first cup shaped cover through said passageway in the center of said diaphragm and out of said central aperture of said second shaped cover means.

7. A flow through regulator according to claim 2 wherein said valve seat member has a coined conical shaped valve seat surrounding one end of said passageway.

8. A flow through regulator according to claim 2 wherein fuel flows from said at least one inlet opening in said first cup shaped cover through said passageway in the center of said diaphragm and out of said tubular exit port of said second shaped cover means.

* * * * *